United States Patent [19]
Munce et al.

[11] Patent Number: 5,604,875
[45] Date of Patent: Feb. 18, 1997

[54] METHOD AND APPARATUS FOR REMOVABLY CONNECTING EITHER ASYNCHRONOUS OR BURST CACHE SRAM TO A COMPUTER SYSTEM

[75] Inventors: George R. Munce, Aloha; James D. Warren, Hillsboro, both of Oreg.

[73] Assignee: Intel Corporation, Santa Clara, Calif.

[21] Appl. No.: 358,798

[22] Filed: Dec. 19, 1994

[51] Int. Cl.⁶ .............................. G06F 13/00; G06F 12/00
[52] U.S. Cl. .......................................... 395/311; 395/442
[58] Field of Search ................................... 395/311, 431, 395/403, 442, 833, 481

[56] References Cited

U.S. PATENT DOCUMENTS

| | | | |
|---|---|---|---|
| 4,281,392 | 2/1981 | Grants et al. | 364/DIG. 2 |
| 4,396,978 | 8/1983 | Hammer et al. | 364/DIG. 1 |
| 4,500,933 | 2/1985 | Chan | 360/69 |
| 5,027,315 | 6/1991 | Agrawal et al. | 395/800 |
| 5,038,299 | 8/1991 | Maeda | 364/DIG. 2 |
| 5,237,672 | 8/1993 | Ing-Simmons et al. | 395/421.01 |
| 5,253,357 | 10/1993 | Allen et al. | 395/442 |
| 5,301,343 | 4/1994 | Alvarez | 395/442 |
| 5,357,624 | 10/1994 | Lavan | 395/442 |

*Primary Examiner*—Jack B. Harvey
*Assistant Examiner*—Xuong M. Chung-Trans
*Attorney, Agent, or Firm*—Blakely, Sokoloff, Taylor & Zafman

[57] ABSTRACT

A cache SRAM connector assembly comprising a connector, a number of latches, and a number of high performance switches, is provided to a computer system. The connector removably connects either asynchronous or burst cache SRAM to a processor bus. The latches store cache access addresses being driven on a number of address lines of the processor bus. The high performance switches being coupled to both the latches and the address lines of the processor bus selectively provide the cache SRAM with latched access addresses as required by asynchronous cache SRAM or directly driven access addresses on the processor bus as required by burst cache SRAM.

9 Claims, 2 Drawing Sheets

METHOD AND APPARATUS FOR REMOVABLY CONNECTING EITHER ASYNCHRONOUS OR BURST CACHE SRAM TO A COMPUTER SYSTEM

BACKGROUND OF THE INVENTION

1. Field of the Invention

The present invention relates to the field of computer systems. In particular, the present invention relates to scalability of cache memory of a computer system.

2. Background Information

As microprocessor technology continues to evolve in a faster and faster pace, purchasers of microprocessor based computer systems demand better performance scalability from the system manufacturers to protect their investment. A particular aspect of performance scalability is cache scalability. In addition to the traditional scalability in size, with the emergence of burst cache SRAM, purchasers of these systems also desire being able to upgrade from the slower performance asynchronous cache SRAM to the higher performance burst cache SRAM.

However, the manner in which addresses are provided to asynchronous cache SRAM is different from the manner addresses are provided to burst cache SRAM. From the system/component manufacturer's perspective, it would be a big cost advantage to be able to support either type of cache SRAM with the same basic hardware.

As will be disclosed in more detail below, the present invention provides a method and apparatus for removably connecting either asynchronous or burst cache SRAM to a computer system that achieves these and other desired results.

SUMMARY OF THE INVENTION

The desired results are advantageously achieved by providing a cache SRAM connector assembly to a computer system, comprising a connector, a number of latches, and a number of high performance switches. The connector removably connects either asynchronous or burst cache SRAM to a processor bus. The latches store cache access addresses being driven on a number of address lines of the processor bus. The high performance switches being coupled to both the latches and the address lines of the processor bus selectively provide the cache SRAM with latched access addresses as required by asynchronous cache SRAM or directly driven access addresses on the processor bus as required by burst cache SRAM, responsive to an address provision manner selection signal.

Each of the high performance switches has a switching speed less than 15 ns, and a data propagation delay of no more than 0.25 ns. In one embodiment, the high performance switches are made of FETs. Furthermore, in one embodiment, a jumper is used to provide the high performance switches with the address provision manner selection signal.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
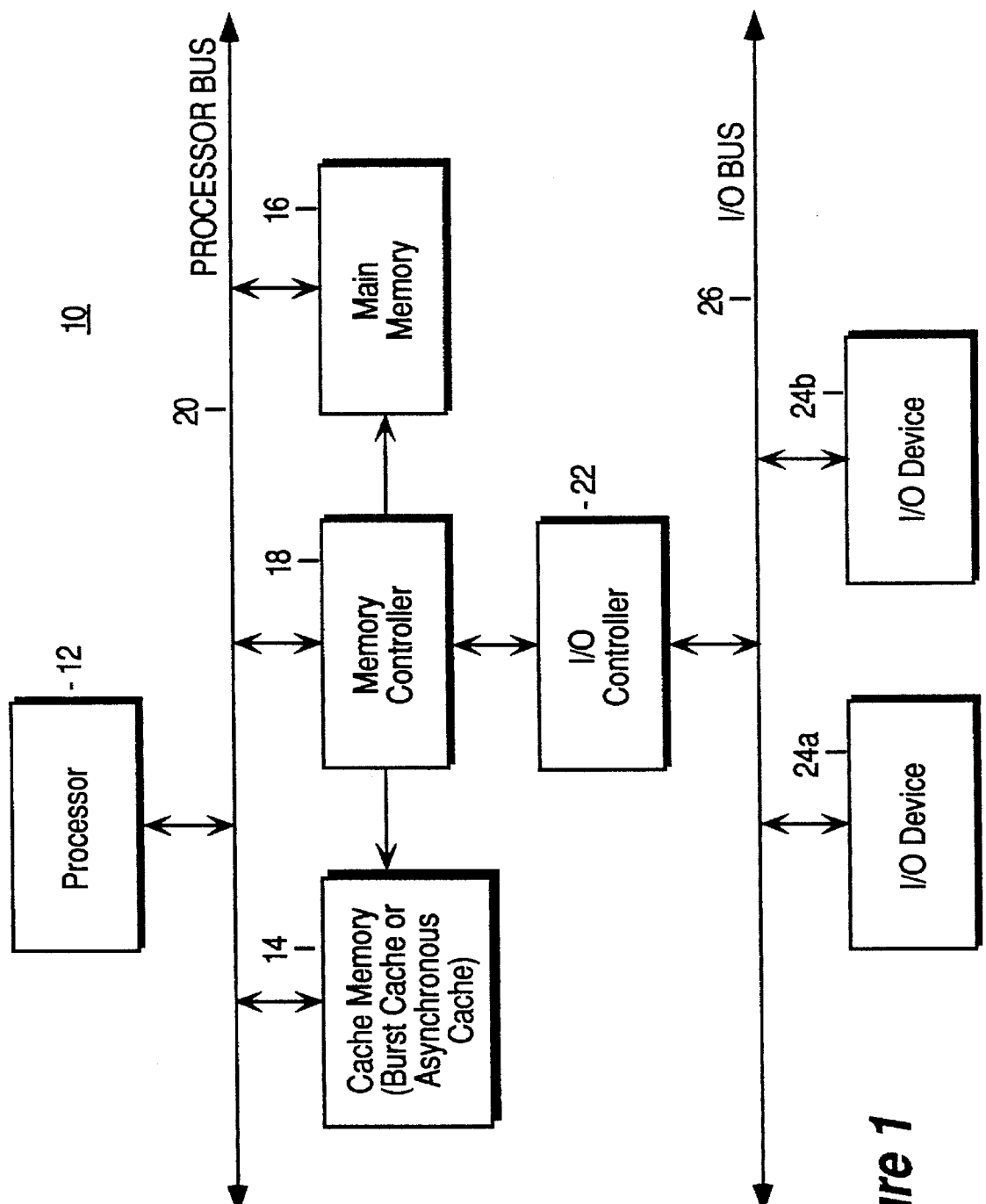
FIG. 1 illustrates an exemplary computer system incorporated with teachings of the present invention.

Referring now to FIG. 1, a block diagram illustrating an exemplary computer system incorporating the teachings of the present invention is shown. Exemplary computer system 10 comprises processor 12, cache memory 14, main memory 16, memory controller 18, and processor bus 20 interconnected to each other as shown. Furthermore, exemplary computer 10 comprises I/O controller 22, I/O devices 24a—24b, and I/O bus 26 interconnected to each other as shown. The memory and I/O controllers 18 and 22 are also coupled to each other.

Cache memory 14 comprises either lower performance asynchronous cache SRAM or high performance burst cache SRAM removably connected to the cache memory connector assembly of the present invention, which will be described in detail below with additional references to FIG. 2. As will be appreciated by one skilled in the art, because of different timing requirements, access addresses are provided to the two types of cache SRAM in different manners. More specifically, asynchronous cache SRAM are provided with latched access addresses, whereas burst cache SRAM are provided with directly driven access addresses on the processor bus. As will be obvious from the descriptions to follow, because of the teachings of the present invention incorporated in cache SRAM connector assembly, the SRAM type of the cache SRAM removably connected may be either asynchronous or burst.

Except for the cache SRAM connector assembly of the present invention, all other elements 12–24a & 24b of exemplary computer system 10 including the asynchronous as well as burst SRAM themselves are intended to represent a broad category of these elements found in many computer systems. Their constitutions and functions are well known and will not be otherwise further described.

Figure 2:
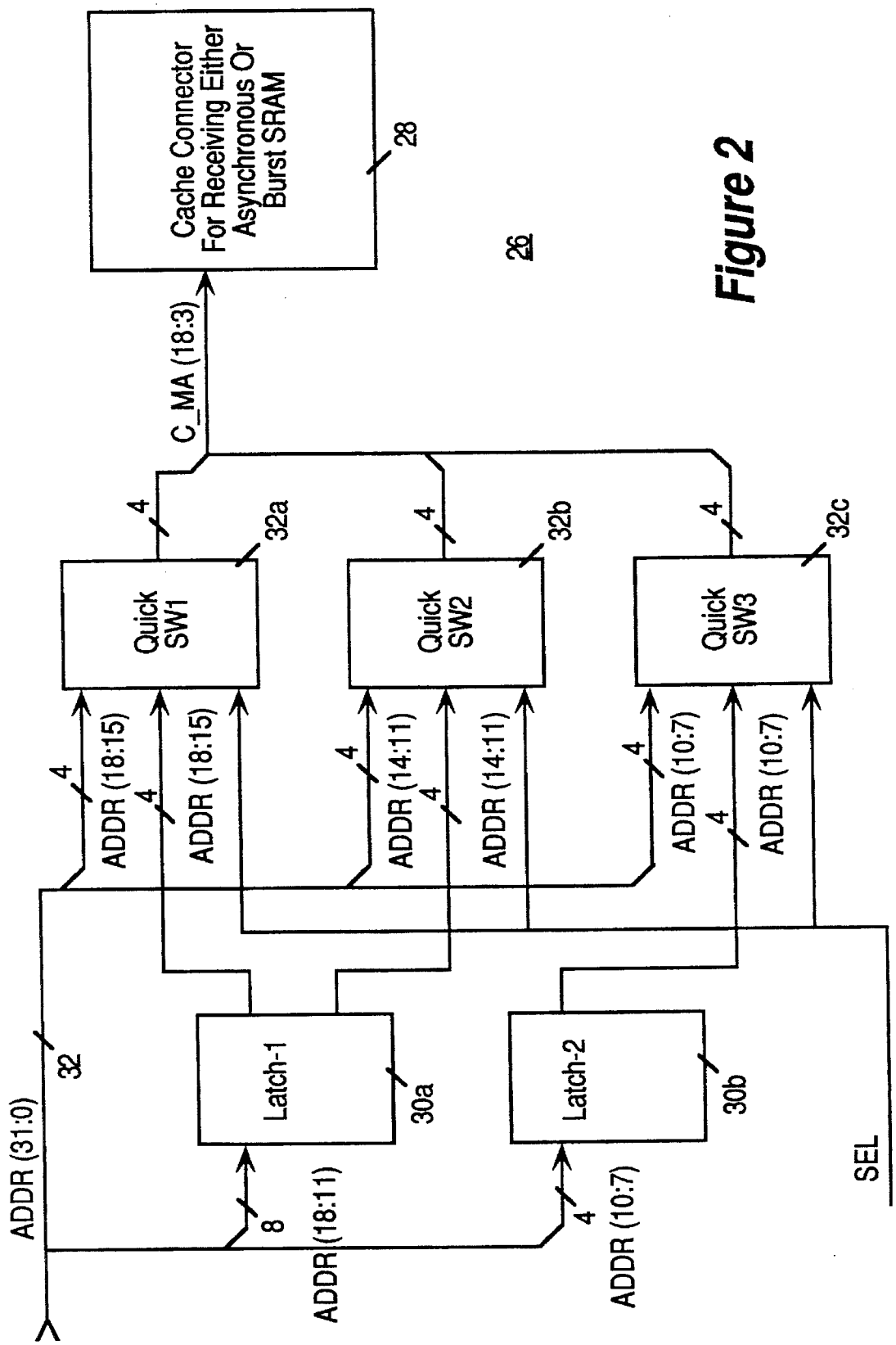
FIG. 2 illustrates one embodiment of the cache SRAM connector assembly of the present invention.

FIG. 2 illustrates one embodiment of the cache SRAM connector assembly 26 of the present invention. As shown, cache SRAM connector assembly 26 comprises a connector 28, a number of latches 30a—30b, and a number of high performance switches 32a—32c. The connector 28 removably connects either asynchronous or burst cache SRAM to the processor bus 20. The latches 30 store cache access addresses being driven on a number of address lines of the processor bus 20. The high performance switches 32a–32c being coupled to both the latches 30a–30b and the address lines of the processor bus 20 selectively provide the cache SRAM (not shown) with latched access addresses as required by asynchronous cache SRAM or directly driven access addresses on the processor bus 20 as required by burst cache SRAM, responsive to an address provision manner selection signal (SEL).

In the illustrated embodiment, two latches 30a–30b are employed to latch address bits [18:11] and [10:7] respectively of an access address. Three high performance switches 32a–32c are employed to selectively provide either latched or directly driven address bits [18:15], [14:11], and [10:7] respectively to the removably connected cache SRAM.

Each of the high performance switches 32a–32c has a switching speed less than 15 ns, and a data propagation delay of no more than 0.25 ns. As will be appreciated by those skilled in the art, these are speeds necessary to meet the timing requirements of typical burst SRAM, and these speeds are unachievable by conventional multiplexors.

In one embodiment, the high performance switches 32a–32c are made of FETs. Particular examples of such high performance switches 32a–32c include High-Speed CMOS QuickSwitch® manufactured by Quality Semiconductor Inc. of Santa Clara, Calif.

Furthermore, in one embodiment, a jumper (not shown) is used to provide the high performance switches 32a–32c with the address provision manner selection signal (SEL). In an alternate embodiment, special detection pins may be provided to the connector 28 to generate detection signals, when set, denote the removably attached cache SRAM as either asynchronous or burst. An additional state machine may then be provided to decode the detection signals and provide SEL to the high performance switches 32a–32c.

Since access addresses are deliverable in either manner, i.e. the manner required by asynchronous SRAM or the manner required by burst SRAM, SRAM of either type may be used. A motherboard embodied with the present invention may support either type of SRAM. The motherboard manufacturer may support the desired cache type scalability with the same motherboard.

Thus, a method and apparatus for removably connecting either asynchronous or burst cache SRAM to a computer system has been described. While the methods and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A cache static random access memory (SRAM) connector assembly comprising:

a connector for removably receiving and connecting either asynchronous cache SRAM or burst cache SRAM to a bus, the asynchronous and burst cache SRAM having an opposing latched and unlatched manner of address delivery requirement respectively;

storage circuitry coupled to the bus for storing a plurality of address bits of a memory address being driven on the bus by a bus agent coupled to the bus; and high performance switching circuitry coupled to the connector, the storage circuitry and the bus for providing either the stored address bits to a connected asynchronous cache SRAM or the address bits on the bus to a connected burst cache SRAM, the high performance switching circuitry having a switching speed of not more than 15 ns and a data propagation delay of not more than 0.25 ns, thereby allowing the opposing unlatched and latched manner of address delivery to be selectively met, but without consequentially distorting address timing.

2. The cache SRAM connector assembly as set forth in claim 1, wherein the storage circuitry comprises a plurality of latches.

3. The cache SRAM connector assembly as set forth in claim 1, wherein the switching circuitry comprises a plurality of FETs.

4. A motherboard comprising:

a processor bus including a plurality of address lines and a plurality of data lines for transferring address bits of memory addresses and data respectively;

main memory coupled to the processor bus for storing data and responding to memory addresses being driven on the processor bus by a processor coupled to the processor bus;

a cache static random access memory (SRAM) connector assembly coupled to the processor bus for removably connecting either asynchronous or burst cache SRAM to the processor bus, the asynchronous or burst cache SRAM being used to cache a subset of the data of the main memory and respond to the memory addresses, the connector assembly comprising:

a connector for removably receiving and connecting either the asynchronous or burst cache SRAM to the processor bus, the asynchronous and burst cache SRAM having an opposing latched and unlatched manner of address delivery requirements, respectively;

storage circuitry coupled to the processor bus for storing a plurality of addresses bits of a memory address being driven on the processor bus by the processor; and high performance switching circuitry coupled to the connector, the storage circuitry and the processor bus for selectively providing either the stored address bits to a connected asynchronous cache SRAM or the address bits on the processor bus to a connected burst cache SRAM, the high performance switching circuitry having a switching speed not more than 15 ns and a data propagation delay of not more than 0.25 ns, thereby allowing the opposing unlatched and latched manner of address delivery to be selectively met, but without consequentially distorting address timing.

5. The motherboard as set forth in claim 4, wherein the storage circuitry comprises a plurality of latches.

6. The motherboard as set forth in claim 4, wherein the switching circuitry comprises a plurality of FETs.

7. A computer system comprising:

a processor for executing instructions;

a processor bus coupled to the processor including a plurality of address lines and a plurality of data lines for transferring address bits of memory addresses and data respectively;

main memory coupled to the processor bus for storing data and responding to memory addresses being driven on the processor bus by the processor;

a cache static random access memory (SRAM) connector assembly coupled to the processor bus for removably connecting either asynchronous or burst cache SRAM to the processor bus, the asynchronous or burst cache SRAM being used to cache a subset of the data of the main memory and respond to the memory addresses, the connector assembly comprising:

a connector for removably receiving and connecting either the asynchronous or the burst cache SRAM to the processor bus, the asynchronous and burst cache SRAM having an opposing latched and unlatched manner of address delivery requirement respectively;

storage circuitry coupled to the processor bus for storing a plurality of address bits of a memory address being driven on the processor bus by the processor; and high performance switching circuitry coupled to the connector, the storage circuitry and the processor bus for selectively providing either the stored address bits or the address bits to a connected asynchronous cache SRAM on the processor bus to a connected burst cache SRAM, the high performance switching circuitry having a switching speed of not more than 15 ns and a data propagation delay of not more than 0.25 ns, thereby allowing the opposing latched and unlatched manner of address delivery to be selectively met but without consequentially distorting address timing.

8. The computer system as set forth in claim 7, wherein the storage circuitry comprises a plurality of latches.

9. The computer system as set forth in claim 7, wherein the switching circuitry comprises a plurality of FETs.

* * * * *